Patented Apr. 18, 1939

2,154,509

UNITED STATES PATENT OFFICE 2,154,509

DIAZO SULPHONIC ACID ESTERS AND METHOD OF MAKING

Jean G. Kern, East Aurora, N. Y., assignor to National Aniline and Chemical Company, Inc., New York, N. Y., a corporation of New York No Drawing. Application August 11, 1936, Serial No. 95,483

5 Claims. (Cl. 260—141)

This application relates to a new class of chemical compounds and to the production and use of such compounds. It is in part a continuation of my application Serial No. 691,819, filed October 2, 1933.

In application Serial No. 95,481, filed on the same date herewith, I have described and claimed a new class of chemical compounds, namely the alkylolamino-methylene sulphurous acids and sulphites of the general formula:

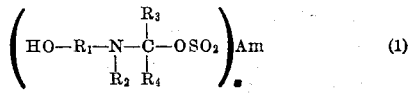

wherein $R_1$ represents an alkyl, cyclo-alkyl, hydroxyalkyl, or polyhydroxy-alkyl group; $R_2$ represents hydrogen or an alkyl or cycloalkyl group or the group $HO-R_1$; $R_3$ represents hydrogen or an alkyl group; $R_4$ represents hydrogen or an alkyl group or, but only when $R_3$ represents H, an aryl group; Am represents hydrogen or a metal atom; and $x$ is an integer which equals the valence of Am. As pointed out in that application, such compounds may be employed for numerous purposes.

In accordance with the invention of the present application I have found that alkylolamino-methylene sulphurous acids and sulphites of the type defined by the above formula wherein $R_2$ represents an alkyl or cycloalkyl group or the group, $HO-R_1$, may be reacted with aromatic diazonium salts to yield diazo-sulphonic esters of the general formula:

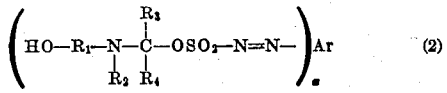

wherein $R_1$ represents an alkyl, cycloalkyl, hydroxyalkyl, or polyhydroxy-alkyl group; $R_2$ represents an alkyl or cycloalkyl group or the group, $HO-R_1$; $R_3$ represents hydrogen or an alkyl group; $R_4$ represents hydrogen or an alkyl group or, but only when $R_3$ represents H, an aryl group; Ar represents the aromatic residue of a diazotizable aromatic mono- or diamine; and $x$ represents 1 or 2.

The diazo-sulphonic esters of the present invention may be prepared by coupling a diazonium salt derived from an aromatic amine, in the presence of an acid binding agent such as NaOH, $Na_2CO_3$, $K_2CO_3$, etc., with an alkylolamino-methylene sulphurous acid or sulphite. These diazo-sulphonic acid derivatives are capable of existing in two tautomeric forms, a "syn" form which has active coupling properties and which is usually very deeply orange, and a non-coupling "anti" form which is only very slightly colored. The tautomerization is comparatively rapid, especially so at an elevated temperature. Each of the tautomers may be crystallized out in rather pure form, for example from its mother liquor.

Although it has been proposed to employ diazo-sulphonic acids in admixture with soluble salts of coupling components, such as sodium salts of the arylides of 2,3-hydroxy-naphthoic acid, to produce insoluble azo dyes on the fiber, the coupling ability of the diazo-sulphonic acids in general is so poor that the processes as a rule are inoperative. Similarly, although it is disclosed in the literature that diazo-sulphonic acids of the type

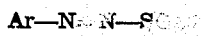

have been employed in photography in an effort to utilize their light sensitivity, their coupling ability during exposure to light is of such a nature that they have not been adopted for general use in a color process of any practical commercial value.

The diazo-sulphonic esters of the present invention have been found to possess rapid and desirable coupling properties, and to give when admixed with soluble salts of the commercial developers or coupling components such as sodium salts of the arylides of aceto-acetic or 2,3-hydroxy-naphthoic acid, very stable printing and dyeing compositions which yield (upon application to fiber, aging, steaming, and acidic development) insoluble azo dyes of excellent depth and brilliancy. The diazo-sulphonic esters of the present invention not only serve admirably for the preparation of azo dyes and prints on textile fibers but because of their sensitivity to light may be used for obtaining colored photographic prints. The sensitiveness to light of the diazo-sulphonic acids and their derivatives appears to increase with the molecular weight of the radical

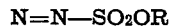

$$N=N-SO_2OR$$

where R represents hydrogen, a metal, or an organic radical.

The sensitiveness to light of the diazo-sulphonic esters of the present invention renders them especially useful for the production of photographic pictures or for the development of the various azo colors on textile fibers by exposing the fibers printed or impregnated with the diazo-sulphonic ester and a suitable coupling component to a light source. The diazo-sulphonic esters may be worked up into printing inks such as are used for the printing of paper. The preparations so made are useful for rotogravure works wherein the color is not of the superficial pigmentary type but is actually a coloring developed in and on the fibers. Excellent results may be obtained in this manner, especially with the well-known three color process.

Printing and dyeing compositions may be prepared by merely mixing, either in the presence or absence of wetting agents, equivalent quantities of the diazo-sulphonic ester and a coupling component; the latter is preferably in the form of an alkali-metal salt. If desired, the mixture may be obtained by simultaneous precipitation of the diazo-sulphonic ester and the coupling component. The mixtures may be obtained in dry powder form by drying and grinding the precipitate.

Particularly suitable for the preparation of the diazo-sulphonic acid esters of the present invention are the diazotizable aromatic amines represented by the general formula:

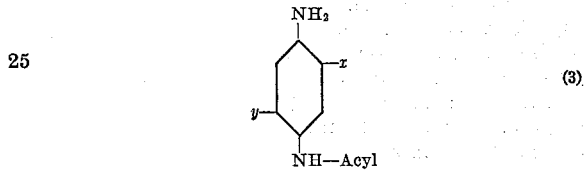

wherein $x$ and $y$ are the same or different and represent halogens or alkyl or alkyloxy radicals, and the diazotizable aromatic amines represented by the general formula:

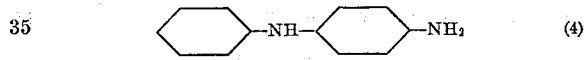

which also may be substituted nuclearly for example by other $NH_2$ groups and/or alkyl, alkoxy radicals, etc.

Examples of suitable diazonium salts are those derived from aromatic amines of the benzene, naphthalene, anthraquinone, and carbazole series, for instance, the diazonium salts of meta-chlor-aniline, 2-methyl-5-chlor-aniline, 2,5-di-chlor-aniline, 2,5-dichlor-4-methyl-aniline, 2-methoxy-5-chlor-aniline, 2-methyl-4-nitro-aniline, 3-nitro-4-methyl-aniline, 2-amino-4-methoxy-5-benzoylamino-1-chlorbenzene, 4-chlor-4'-amino-2', 5'-diethoxy-azobenzene, dianisidine, benzidine, 2,5-dimethoxy-4-(4'-methylbenzene-1'-sulphonylamino)-aniline, 4,4'-diamino-diphenylamine, 4-amino-4'-methoxy-diphenylamine, 4-amino-3-methoxy-diphenylamine, 2-methoxy-5-chlor-4-benzoylamino-aniline, 2-methyl-5-methoxy-4-benzoylamino-aniline, 2,5-dimethoxy-4-benzoylamino-aniline, 2-chlor-5-methoxy-4-benzoylamino-aniline.

In view of their excellent solubility, I have found the dialkylolamino-methylene sulphitic diazo derivatives of the present invention to particularly advantageous for use in printing and dyeing and similar processes.

The diazo-sulphonic esters may be converted into active coupling diazo compounds by treatment in a weakly acidic medium with an oxidizing agent such as an alkali-metal-hypochlorite. Thus printings, paddings, etc., of mixtures of diazo sulphonic esters with developers may be fully developed by a passage through a weakly acidic solution of sodium hypochlorite in acetic acid. In some cases the use of the oxidizing agent is not essential for obtaining a reasonably satisfactory development of the azo dye. However very superior results are obtained when oxidizing agents are added to printing pastes or dyeing liquors containing diazo-sulphonic acid esters derived from alkylolamino-methylene sulphites as above described.

The following specific examples serve to illustrate the preparation and use of the compounds of the present invention. Parts are by weight.

Example 1.—The diazonium chloride solution prepared from 219 parts of 2,5-dichlor-4-acetyl-amino-aniline, 258 parts hydrochloric acid (20° Bé.), and 70 parts sodium nitrite, is added slowly, at a temperature from about 5° C. to about 10° C., to a cold solution (0° C. to 5° C.) of 230 parts diethanol-amino-methylene sulphite of sodium and 160 parts soda ash ($Na_2CO_3$). The solution turns very rapidly a deep orange and is agitated until it does not show any coupling properties. The product may then be salted out, recrystallized from hot water, filtered off, and dried. It has the following probable formula:

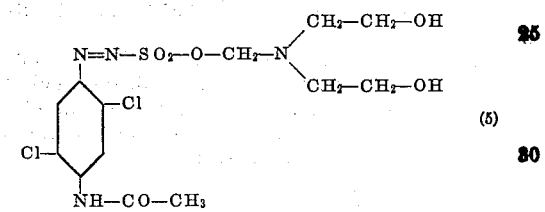

It has excellent solubility in alcohol, acetone, and water and, for use in printing textiles, may be readily admixed with the soluble sodium salt of any coupling arylide, for example the arylides of 2,3-hydroxy-naphthoic acid or other hydroxy- or amino-naphthoic acid, of carbazole carboxylic acid, of hydroxy-anthracene or anthraquinone carboxylic acid, etc.

For instance, a printing paste may be made as follows: 75 parts of an equimolar mixture of the above product and the sodium salt of the anilide of 2,3-hydroxy-naphthoic acid are dissolved in 400 parts of water and 25 parts of the monoethyl ether of glycol and the solution thickened with 500 parts of a starch-tragacanth paste containing approximately 40 parts of neutral sodium chromate ($Na_2CrO_4.10H_2O$).

A textile material is printed with this paste, dried, aged from 5 to 10 minutes, or steamed, then passed through an acid development bath, rinsed, soaped and finished. A very deep and fast garnet shade is thus obtained.

In a similar fashion a multi-color pattern may be thus printed by applying simultaneously various printing pastes composed of different diazo-sulphonic esters and developers.

Example 2.—The tetrazonium chloride solution obtained by diazotizing 199 parts by weight 4,4'-diamino-diphenylamine with 430 parts HCl (20° Bé.) and 140 parts of sodium nitrite, is added slowly, at a temperature of about 5° C. to about 10° C., to a 15% aqueous solution of 500 parts of diethanol-amino-isopropylidene-sulphite of sodium and 240 parts soda ash ($Na_2CO_3$) while stirring and keeping the temperature of the mixture between about 0° C. and 5° C. The solution ceases to couple after a while and upon salting the solution a crystalline product is obtained which has the following probable formula:

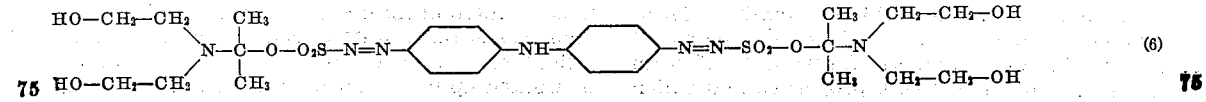

This product when admixed with the sodium salt of the anilide of 2,3-hydroxy-naphthoic acid in a molar ratio of 1:2 and when printed by a method similar to that described in Example 1 produces, after steaming and acidic aftertreatment a very deep black.

Example 3.—Bleached cotton fabric is impregnated, by the padding method for instance, with a solution composed of 120 parts of an equimolecular mixture of the sodium salt of 2,3-hydroxy-naphthoyl-anilide, and the diazo-sulphonic ester obtained from 2,5-dimethoxy-4-(4'-methyl-benzene - 1' - sulphonylamino) - benzene-1-diazonium chloride and the sodium salt of diethanol-amino-methylene sulphurous acid,

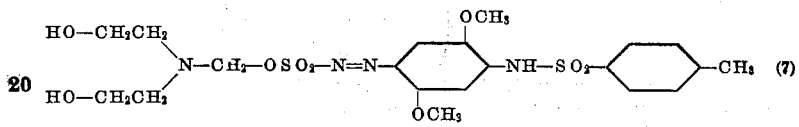

40 parts of a 5% gum tragacanth solution, 5 parts of caustic soda solution (34° Bé.), 20 parts Turkey red oil, 25 parts of 25% sodium chromate solution, and 790 parts water. The goods are then dried and aged from 5 to 10 minutes, and if necessary passed through an acid bath, rinsed, and soaped. A very rich purple dyeing is thus obtained.

Example 4.—3.4 parts of the diazo-sulphonic ester obtained from meta-chloro-benzene-diazonium chloride and diethanolamino-isopropylidene sulphite of sodium, and which has the probable formula:

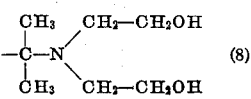 (8)

are dissolved in 30 parts water which contains 2 parts gum tragacanth as a thickening agent, whereupon a solution of 2.8 parts of the toluidide of 2,3-hydroxy-naphthoic acid and 0.4 part caustic soda in 30 parts water, is added. This solution is then made up to 100 parts by weight with a solution consisting of 1 part sodium chlorate in about 32½ parts of water.

A sheet of cellulose fiber such as ordinary paper is impregnated with this solution. The impregnated paper is then dried and covered with a photographic negative and exposed to light. After a few minutes in a strong sunlight or a longer time in artificial light, the time depending upon the intensity of the light source, the coupling is complete; the paper is then washed, rinsed, and dried. With the above solution a very rich orange-colored positive picture is thus obtained.

Equimolar parts of diazo-sulphonic ester and developer may be emulsified in gelatin, applied as a coating on paper and developed as above with similar results.

Example 5.—28.3 parts 100% metachlor-toluidine (M. W. 141) are dissolved in 21.5 parts HCl, 20° Bé. and 250 parts water. The solution is iced to reduce its temperature to about 0° C. and additional ice is added to maintain a temperature of about 0° C. during the diazotization (approximately 100 parts of ice are needed). 14 parts sodium nitrite are dissolved in about 50 parts water and added to the iced metachlor-toluidine hydrochloride solution to diazotize it. A slight quantity of nitrous acid should be present through the diazotization and a mineral acidity test on Congo paper must be maintained. The temperature should not be allowed to rise above 5° C. during the diazotization.

An aqueous solution containing a slight excess over ⅕ of a mol. of benzaldehyde-o-sulphonic-acid - bisulphite - diethanolamine condensation product (which may be made according to Example 8 of my application Serial No. 95,481 referred to above) is transferred to a suitable vessel and iced to about 0° C. 25 parts of soda ash are added to this solution; then the diazotized meta-chlor-toluidine solution is added thereto in small amounts as taken up in the coupling until all diazotized metachlor-toluidine has been used. When the coupling is finished, there is no test for diazotized metachlor-toluidine with R salt and a slight test for excess of the coupling component as shown by test with the diazo metachlor-toluidine base or diazo-para-nitraniline. The mixture may be stirred about 1 hour longer, then salted cold with sodium chloride until no more of the product is deposited from the solution. The product is in the form of beautiful golden yellow crystals which are separated as a cake by filtration and dried in vacuo at 60° C.

The new diazo-sulphonic ester has the following probable formula:

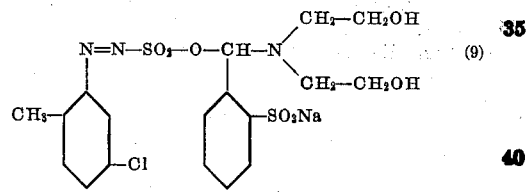 (9)

Example 6.—Meta-chlor-aniline, 12.7 parts (M. W. 127.57) and 21.5 parts muriatic acid 20° Bé. are put in solution in 250 parts water, iced to about 0° C. and treated with an aqueous solution of 7 parts sodium nitrite until the m-chloraniline is completely diazotized. The temperature is maintained during diazotization at about 0° C.

A slight excess over 1/10 mol. of the benzaldehyde-ortho-sulphonic-acid-bisulphite-diethanolamine condensation solution (as in Example 5) is treated with 25 parts soda ash and cooled with ice to about 0° C. Diazotized meta-chlor-aniline solution (as made above) is added thereto in small portions as coupling takes place.

When the coupling is considered complete, there is a positive test for the coupling component with diazotized para-nitraniline and a negative test for diazotized meta-chlor-aniline. The solution is then salted with sodium chloride until complete precipitation of the coupled compound is effected. The product thus obtained in the form of golden yellow crystals is separated as a cake by filtration and dried in vacuo at 60° C. The new diazo-sulphonic ester has the following probable formula:

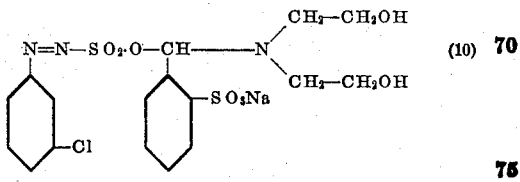 (10)

In the above reactions the diethanolamino-ortho-sulpho-benzal-sulphite of sodium may be replaced by the diethanolamino-2,5-disulpho-benzal-sodium-sulphite whereby end products with similar properties to those displaced by the end products obtained in the foregoing example, are obtained.

The terms "alkyl" and "cycloalkyl" as used herein are intended to have their normal meaning designating hydrocarbon radicals of the chain and cyclic types respectively.

I claim:

1. Compounds of the general formula:

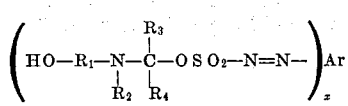

wherein $R_1$ represents a member of the group consisting of alkyl, cycloalkyl, hydroxyalkyl, and polyhydroxy-alkyl groups; $R_2$ represents a member of the group consisting of alkyl and cycloalkyl groups, and the group, HO—$R_1$; $R_3$ represents a member of the group consisting of hydrogen and alkyl groups; $R_4$ represents a member of the groups, and the group, HO—$R_1$; $R_3$ represents a and, but only when $R_3$ represents H, aryl groups; Ar represents a member of the group consisting of the aromatic residues of diazotizable aromatic mono- or di-amines; and $x$ represents a member of the group consisting of 1 and 2.

2. As new chemical compounds the aromatic diazo-sulphonic acid dialkylolamino-methylene esters.

3. A light-sensitive diazo dye intermediate comprising the compound having the following probable formula:

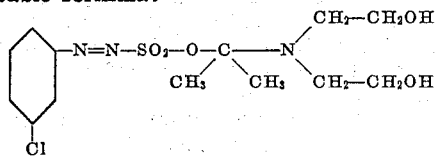

said product being obtainable by reacting the diazonium chloride of m-chlor-aniline with N-diethanol-amino-isopropylidene-sodium-sulphite.

4. The method of producing the products of claim 1, which comprises admixing in alkaline solution an aromatic diazonium salt with a compound of the formula:

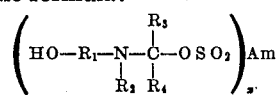

wherein $R_1$ represents a member of the group consisting of alkyl, cycloalkyl, hydroxyalkyl, and polyhydroxy-alkyl groups; $R_2$ represents a member of the group consisting of alkyl and cycloalkyl groups, and the group HO—$R_1$; $R_3$ represents a member of the group consisting of hydrogen and alkyl groups; $R_4$ represents a member of the group consisting of hydrogen and alkyl groups and, but only when $R_3$ represents H, aryl groups; Am represents a member of the group consisting of hydrogen and metal atoms, and $x$ is an integer which equals the valence of Am.

5. The method of producing the products of claim 2, which comprises admixing in alkaline solution a dialkylolamino-methylene sulphite and an aromatic diazonium salt.

JEAN G. KERN.

CERTIFICATE OF CORRECTION.

Patent No. 2,154,509.   April 18, 1939.

JEAN G. KERN.

It is hereby certified that error appears in the printed specification of the above numbered patent requiring correction as follows: Page 1, first column, line 14, at the end of Formula 1, for the dot below "Am" read x; line 37, at the end of Formula 2, for the dot below "Ar" read x; page 2, first column, line 60, after the word "to" insert be; page 4, first column, line 5, for "displaced" read displayed; line 27, claim 1, for the words "groups, and the group, HO—$R_1$; $R_3$ represents a" read groups consisting of hydrogen and alkyl groups; and that the said Letters Patent should be read with this correction therein that the same may conform to the record of the case in the Patent Office.

Signed and sealed this 6th day of June, A. D. 1939.

Henry Van Arsdale (Seal)    Acting Commissioner of Patents.